July 20, 1926.
E. L. HYDE
CORN POPPER
Filed Nov. 23, 1925
1,592,829
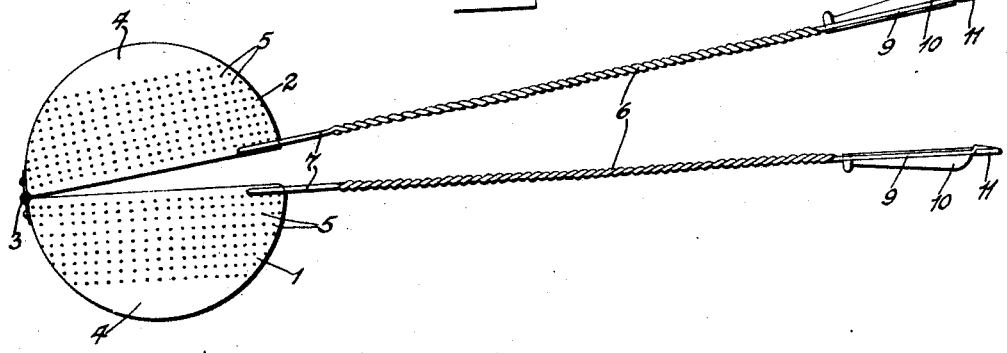
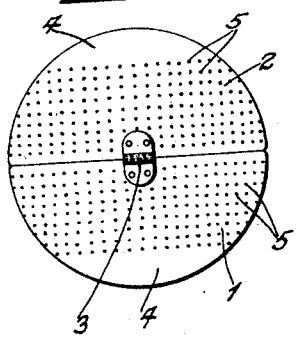
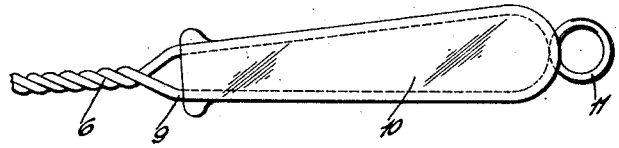
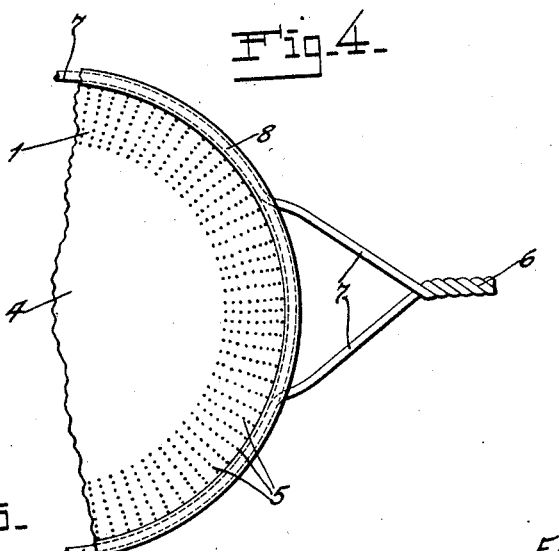
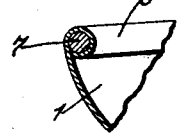
Inventor:
Erma L. Hyde,
Her Attorneys.

Patented July 20, 1926.

1,592,829

UNITED STATES PATENT OFFICE.

ERMA L. HYDE, OF NIANGUA, MISSOURI.

CORN POPPER.

Application filed November 23, 1925. Serial No. 70,738.

This invention relates to a device for use as a corn popper and for other purposes to which it may be applied.

An object of the invention is to provide an improved corn popper, which may also be applied to other useful purposes, comprising a pair of connected parts arranged to form an enclosure to confine the pop corn and other materials during the time that the device is in use and which may be separated to permit removal of the contents after their preparation has been completed.

Another object of the invention is to provide a device of the character and for the purpose mentioned comprising an enclosure composed of a pair of cooperative members pivotally connected and hinged together at one side and having handles projecting from the opposite side of the respective members and arranged to be brought together so that when the handles of the two members are held by the hand, the two parts of the enclosure are thereby held in closed relationship.

Another object of the invention is to provide a device of the character and for the purpose mentioned in which the two parts of the enclosure are formed of sheets of aluminum properly shaped so that when the two parts are brought together, the enclosure is complete and each part having an imperforate bottom portion to contain liquid ingredients such as heated butter or lard and granulated or powdered ingredients such as salt and other seasonings, and perforated upper portions permitting the escape of fumes and vapors from the enclosure.

Another object of the invention is to provide a device of the character and embodying the structure last above-mentioned, in which the two parts are hinged together at one side and each has a handle member extending from the opposite side, which handle members are arranged to be brought together and grasped by the hand to hold the parts closed and which may be manipulated to open the parts of the enclosure to permit the contents to be removed.

Other objects will appear from the following description, reference being made to the drawing in which, Fig. 1 is a side elevation of the device showing the two parts of the enclosure partly separated;

Fig. 2 is an end elevation showing the hinge connecting the two parts;

Fig. 3 is an enlarged detail view of one of the handle members;

Fig. 4 is an enlarged plan view showing the manner in which the handle members are connected to the two parts of the enclosure; and Fig. 5 is a sectional view showing the connection of a handle member with a part of the enclosure.

As shown, the enclosure is in the form of a hollow globe composed of two duplicate parts 1 and 2 which, when placed together edgewise, form a complete enclosure. The two parts are connected together at one side by a hinge 3 which permits the two parts to be moved toward or away from each other to close and to open the device.

Preferably each of the two parts 1 and 2 is composed of aluminum, each part consisting of a dished imperforate bottom portion 4 which will contain a liquid and powdered or granulated seasonings; and an upper portion having numerous perforations 5 for the escape of the fumes and vapors.

Each of the two parts 1 and 2 of the enclosure has a handle in connection therewith for holding the two parts closed, for opening the device and for holding the device when it is in use. The handle of each member comprises a piece of wire twisted to form a relatively long stiff handle portion 6. The end portions 7 diverge and extend through holes in the parts 1 and 2 respectively and on the inside of said parts are curved in conformity with the curvature of the walls of said parts 1 and 2. The ends 7 extend nearly around the inside of the parts 1 and 2 so as to obtain proper reinforcement at all points.

The edges 8 of the parts 1 and 2 are rolled around the ends 7 of the wire handles, thus obtaining a reinforced structure at the edges. The outer portions of the wire handles are in the form of loops 9 embracing heat insulating handle elements 10 which may be composed of wood or other material appropriate for that purpose and which when brought together form a handle of proper size and shape to be grasped by one hand. Beyond the ends of the handle members 10, the wire may be shaped to provide loops or eyelets 11, whereby the device may be suspended from a support when not in use.

As previously stated, I prefer to make the parts 1 and 2 of aluminum which I have done heretofore and have found that by the use of aluminum, I have obtained better results, particularly in popping corn, than I have been able to obtain by the use of any other material. A different and better reaction upon the contents is obtained by the use of aluminum than I have been able to obtain by the use of other materials.

I am aware that the specific structure and the relationship of the parts may be varied within equivalent limits without departure from the nature and principle of the invention. I do not restrict myself in any unessential particular, but what I claim and desire to secure by Letters Patent is:

1. A corn popper composed of a pair of semi-globular members, each composed of sheet aluminum having its central portion imperforate and having numerous perforations between said imperforate dished portion and its edge, a hinge uniting said members, and a handle extending from each of said members.

2. A corn popper composed of a pair of semi-globular members, each of said members having a dished imperforate wall at the bottom thereof and a band of perforations around the marginal edge so that when said members are brought together there is a perforated band between the imperforate walls, a hinge connecting said members together at one side, and handles extending outwardly from each of said members at the side opposite to the hinge whereby said members may be opened and closed.

ERMA L. HYDE.